United States Patent
Kaper et al.

[11] Patent Number: 6,024,996
[45] Date of Patent: *Feb. 15, 2000

[54] PACKAGED CARBONATED COFFEE BEVERAGE

[75] Inventors: Louris Kaper, Barneveld; Antonius Johannes Maria Peters, Hedel, both of Netherlands

[73] Assignee: Sara Lee/DE N.V., Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/654,995

[22] Filed: May 29, 1996

[30] Foreign Application Priority Data

May 29, 1995 [NL] Netherlands ............................ 1000450

[51] Int. Cl.[7] .................. A23F 5/00; A23L 2/54; A23L 3/3418
[52] U.S. Cl. .................... 426/131; 426/106; 426/594; 426/397; 426/477; 426/316; 426/329
[58] Field of Search .................... 426/594, 397, 426/477, 433, 131, 106, 474, 316, 329; 53/432–434, 510

[56] References Cited

U.S. PATENT DOCUMENTS

| | | | |
|---|---|---|---|
| 3,261,507 | 7/1966 | Cornelius | 426/594 |
| 3,845,220 | 10/1974 | Suzuki | 426/594 |
| 4,279,938 | 7/1981 | Hildebrand | 426/397 |
| 4,748,040 | 5/1988 | Kuypers | 426/594 |
| 5,290,574 | 3/1994 | Jamieson et al. | 426/131 |
| 5,378,484 | 1/1995 | Suwa et al. | 426/131 |
| 5,384,143 | 1/1995 | Koyama et al. | 426/397 |

FOREIGN PATENT DOCUMENTS

| | | | |
|---|---|---|---|
| 197732 | 10/1986 | European Pat. Off. | 426/397 |
| 85-058114 | 12/1985 | Japan | 426/397 |
| 61-124361 | 6/1986 | Japan | 426/131 |
| 61-273325 | 12/1986 | Japan | 426/131 |
| 1168238 | 7/1989 | Japan | 426/397 |
| 1-240423 | 9/1989 | Japan | 53/432 |
| 2-27967 | 1/1990 | Japan | 426/131 |
| 2-127218 | 5/1990 | Japan | 426/397 |
| 4-040853 | 2/1992 | Japan | 426/397 |
| 6-86660 | 3/1994 | Japan | 426/131 |
| 2089191 | 6/1982 | United Kingdom | 426/397 |
| 2 134 496 | 8/1984 | United Kingdom . | |
| 2254771 | 4/1991 | United Kingdom | 426/397 |
| WO 91/00019 | 9/1991 | WIPO | 426/397 |

*Primary Examiner*—Steven Weinstein
*Attorney, Agent, or Firm*—Evenson, McKeown, Edwards & Lenahan, P.L.L.C.

[57] ABSTRACT

The invention relates to a carbonated coffee beverage which has been packaged under pressure in a pressure-resistant closed container, which beverage is based on coffee extract, the coffee beverage having been packaged in the closed container in the presence of $CO_2$ and nitrogen, which beverage preferably contains sugar and/or sweetener.

9 Claims, No Drawings

PACKAGED CARBONATED COFFEE BEVERAGE

BACKGROUND AND SUMMARY OF THE INVENTION

The invention relates to a carbonated beverage which has been packaged under pressure in a pressure-resistant closed container.

Carbonated soft drinks packaged under pressure in cans are produced and sold on a large scale. The greater part of this market consists of lemonades, such as coke, soft drinks with a fruit flavour and the like. There is also a clear interest in cooled tea, optionally slightly carbonated and/or provided with a supplementary fruit flavour and/or sweetened.

It is also known to package coffee in cans, for consumption, for instance as ice coffee. In practice, this ice coffee is optionally sweetened and is optionally slightly carbonated. The presence of carbon dioxide in the coffee is primarily intended to provide the prickly effect which carbon dioxide is known to have. It also provides a layer of foam on the coffee after it has been poured out. The structure of this layer of foam is comparable to the structure of the foam on espresso coffee.

It is also known to package non-foaming beverages, such as tea, coffee, and fruit juice in cans in the presence of nitrogen gas and carbon dioxide gas. This combination of gases is intended to provide a thin metal package with sufficient internal pressure, so that the package has sufficient strength.

The above application involves non-carbonated (non-fizzy; non-sparkling) beverages, which means that the carbon dioxide content of the liquid is not greater than 0.15% by weight.

The object of the invention is to provide an improved type of packaged coffee drink (coffee extract), which improvement relates especially to the taste, and to a lesser extent to the foaming.

Surprisingly, it has been found that the quality and especially the taste of the carbonated coffee beverage which has been packaged under pressure in a pressure-resistant container, which beverage is based on coffee extract, with the coffee beverage having been packaged in the closed container, can be improved by the presence of nitrogen in the package.

Accordingly, the invention relates to a carbonated coffee beverage which has been packaged under pressure in a pressure-resistant closed container, which beverage is based on coffee extract, the coffee beverage having been packaged in the closed container in the presence of $CO_2$ and nitrogen.

The improvement of the taste is particularly surprising, since it was not known that the presence of nitrogen, known to be a highly inert gas, might have any influence on the taste. It has been found that the taste of the coffee becomes creamier and less sharp, while this taste at the same time becomes richer in character.

According to the invention, the beverage consists of coffee extract (coffee), optionally supplemented with conventional additions, such as sugar, sweeteners, nutrient acid and the like. It is also possible to add supplementary flavour components to the beverage, such as cinnamon, cocoa, rum flavour, fruit flavours and the like.

The coffee extracts to be used can have been obtained in a known manner by extraction of roasted coffee, and supplemented with water to the desired strength. If desired, one can also start from a wholly or partly decaffeinated coffee, or from a blend of decaffeinated and non-decaffeinated coffee.

Optionally, the beverage can also be supplemented with an amount of alcoholic beverage, such as rum, whisky, and the like. It is possible to add milk or milk products to the beverage. If desired, it is also possible to add so-called whiteners, which are not based on milk.

According to a preferred embodiment of the invention, the contents of the container consist substantially of coffee extract, water, $CO_2$, nitrogen, optionally in combination with aromatic, flavouring and sweetening substances.

The mutual proportions of the various components of the coffee beverage can be chosen fairly broadly, the eventual composition being partly dependent on the desired taste of the coffee drink. The amount of gas in the container (carbon dioxide and nitrogen) is chosen such that the pressure in the package is minimally at the level required for the strength of the package. A conventional pressure at room temperature is between 1.01 and 7.0 bar. In case pasteurization is to take place, the maximum pressure is preferably not higher than 3.0 bar. In this connection, it is noted that in the thin cans currently used, an internal pressure is necessary to impart the desired strength to the cans.

According to the invention, such an amount of nitrogen is added that the pressure at 20° C. is 0.2 to 2.0 bar higher than the pressure existing as a result of the addition of $CO_2$ and which can vary from 0.5 to 5.0 bar.

The invention is specifically directed to foaming or effervescent (fizzy, sparkling) coffee, which means that the content of $CO_2$ dissolved in the liquid is greater than 0.15% by weight, more particularly greater than 0.25% by weight (based on the weight of $CO_2$ with respect to the total weight of the liquid).

In practice, it has been found that it is not easy to determine the proper dosage of nitrogen.

In a number of types of coffee extract, an (unpredictable) excessive foaming can occur. It has been found that a good and predictable foaming behaviour is obtained by adding from 0.5 to 10 ppm foam inhibiting agent, typically based on polysiloxanes, such as dimethyl siloxane.

It has additionally been found that another advantage of the invention resides in the fact that the use of nitrogen in the pressurized package gives an improvement of the structure of the foam layer. The consumer sometimes prefers that with ice coffee, after it has been poured out, a foam layer is present on the coffee. It is true that the presence of carbon dioxide in the package already gives rise to some foaming, but the amount and the structure of the foam are not satisfactory if carbon dioxide alone is used. By the co-use of nitrogen, the amount and the nature of the foam have been found to have clearly improved. In this connection, it is noted that it is known that nitrogen can effect an improvement of the foam structure in carbonated beverages.

For the purpose of packaging the beverage in the package, the conventional packaging techniques can be used, provided that it is ensured that the desired amounts of nitrogen gas and carbon dioxide gas are introduced into the package. This is preferably done immediately before the package is closed, prior to pasteurization. The addition can occur in the form of solid carbon dioxide or liquid nitrogen, but it is also possible to introduce the components into the package in gaseous form under pressure. This last can be done in the form of separate gases or by first mixing the gases in the proper amounts and dosing the mixture under pressure.

The invention will now be further explained in and by some examples, which should not be construed as a limitation of the invention.

EXAMPLE 1

A standard aluminium can of a contents of 0.33 l was filled with an amount of coffee extract of a 50/50 Arabica/ robusta blend, and supplemented with water to the desired strength. Also, an amount of sugar has been added to the contents. Prior to pasteurizing at 62° C., so much carbon dioxide and so much nitrogen were dosed to the contents that these gases, upon cooling, respectively provided a partial pressure of 1.75 and 1.25 bar in the can, with a total pressure of 3.0 bar. The content of dissolved carbon dioxide was 0.35% by weight.

Upon cooling of the can with its contents to a temperature of 4–6° C. (refrigerator temperature), the contents were poured out in a cup. A fine foam layer on the surface was observed, of a structure comparable to espresso, which foam layer endured for a prolonged period of time, while the taste of the coffee was excellent.

COMPARATIVE EXAMPLE

For comparison, a can with the same components was fabricated, except that the nitrogen had been omitted. Upon cooling to refrigerator temperature, the contents were likewise poured out in a cup. In comparison with the previous test, the taste was clearly poorer, that is, a less rich, sharper taste, which moreover was less creamy. The foam layer was highly irregular and endured only for a short time.

EXAMPLE 2

Example 1 was repeated, but instead of the coffee extract a decaffeinated coffee extract of a comparable blend was used. As sweetener, a conventional synthetic sweetener was used, such as aspartame, cyclamate and/or saccharin.

Thus, a calorie-free decaffeinated coffee beverage was obtained, which, consumed cool, represented an excellent ice coffee, comparable in quality with the coffee of Example 1.

We claim:

1. A packaged carbonated coffee beverage with at least one of improved taste and foaming behavior, consisting essentially of:
    a coffee beverage, $CO_2$ and nitrogen gas in a pressure-resistant closed container;
    wherein the $CO_2$ is dissolved in the coffee beverage in an amount greater than 0.15 wt. % and the pressure in the closed container due to the $CO_2$ is from 0.5 to 5.0 bar;
    wherein the nitrogen gas is present in an amount corresponding to a pressure in the closed container at 20° C. of 0.2 to 2.0 bar higher than the pressure due to the $CO_2$ addition; and
    wherein the total pressure in the closed container is from 1.01 to 7.0 bar.

2. A carbonated beverage according to claim 1, further comprising at least one of sugar and sweetener.

3. A carbonated beverage according to claim 1, further comprising aromatizing, flavouring, and sweetening substances.

4. A carbonated beverage according to claim 1, wherein the container has been made of metal.

5. A carbonated beverage according to claim 1, wherein also 0.5 to 10 ppm of foam inhibiting agent is present.

6. A packaged carbonated beverage according to claim 1, wherein $CO_2$ is dissolved in the coffee beverage in an amount greater than 0.25 wt. %.

7. A packaged carbonated beverage according to claim 1, wherein $CO_2$ is dissolved in the coffee beverage in an amount of 0.35 wt. %.

8. A packaged carbonated beverage according to claim 1, further comprising at least one of water and milk.

9. A packaged carbonated beverage according to claim 1, wherein said nitrogen causes the coffee beverage to become less sharp.

* * * * *